United States Patent
Gloeckle et al.

(10) Patent No.: US 8,646,253 B2
(45) Date of Patent: Feb. 11, 2014

(54) PROCEDURE AND DEVICE FOR CONTROLLING AN EXHAUST GAS PURIFICATION SYSTEM

(75) Inventors: Markus Gloeckle, Stuttgart (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 616 days.

(21) Appl. No.: 12/940,395

(22) Filed: Nov. 5, 2010

(65) Prior Publication Data

US 2011/0099981 A1    May 5, 2011

(30) Foreign Application Priority Data

Nov. 5, 2009 (DE) .................. 10 2009 046 433

(51) Int. Cl.
*F01N 3/00* (2006.01)
(52) U.S. Cl.
USPC ............................................. 60/286; 60/274
(58) Field of Classification Search
USPC .................................................. 60/286, 274
See application file for complete search history.

(56) References Cited

U.S. PATENT DOCUMENTS

| | | | |
|---|---|---|---|
| 5,267,472 A | 12/1993 | Schneider et al. | |
| 6,161,428 A | 12/2000 | Esteghlala et al. | |
| 2008/0104947 A1* | 5/2008 | Wang et al. | 60/295 |
| 2009/0071131 A1* | 3/2009 | Phillips et al. | 60/286 |

FOREIGN PATENT DOCUMENTS

| | | |
|---|---|---|
| DE | 41 12 478 | 10/1992 |
| DE | 198 03 828 | 8/1999 |
| DE | 199 09 061 | 9/2000 |
| DE | 199 33 736 | 1/2001 |
| DE | 19933736 A1 * | 1/2001 |
| DE | 101 48 128 | 4/2003 |
| DE | 10 2006 041 479 | 3/2008 |
| JP | 2009167844 A * | 7/2009 |

OTHER PUBLICATIONS

English translation of German Patent Application Publication No. DE 19933736 A1.*

* cited by examiner

*Primary Examiner* — Thomas Denion
*Assistant Examiner* — Jason Shanske
(74) *Attorney, Agent, or Firm* — Merchant & Gould P.C.

(57) ABSTRACT

A procedure for controlling an exhaust gas purification system of a combustion engine, consisting of one or several catalytic converters for converting and/or storing at least one exhaust gas component of an exhaust gas of the combustion engine at least one of the catalytic converters is construed as oxidization catalytic converter. With the aid of the adsorption capability of at least partially uncombusted hydrocarbons of one of the catalytic converters a diagnosing forecast about the NO oxidization of the catalytic converters is derived, whereby the at least partially uncombusted hydrocarbons are introduced into the exhaust gas duct at least partially in front of the catalytic converter. With the procedure and the device for implementing the procedure the NO oxidization capability of the involved catalytic converters can be evaluated in the range of extended on-board diagnosis requirements to provide "feed-gas" for subsequent exhaust gas after-treatment systems.

17 Claims, 1 Drawing Sheet

PROCEDURE AND DEVICE FOR CONTROLLING AN EXHAUST GAS PURIFICATION SYSTEM

This application claims benefit of Serial No. 10 2009 046 433.6, filed 5 Nov. 2009 in Germany and which application are incorporated herein by reference. To the extent appropriate, a claim of priority is made to the above disclosed application.

BACKGROUND

The invention relates to a procedure for controlling an exhaust gas purification system of a combustion engine, consisting of one or several catalytic converters for converting and/or storing at least one exhaust gas component of an exhaust gas of the combustion engine, which are arranged in an exhaust gas duct of the combustion engine, whereby at least one of the catalytic converters represents an oxidization catalytic converter. The invention furthermore relates to a device for implementing the procedure according to the invention.

In order to achieve a reduction of ecologically harmful exhaust gas components in exhaust gases of combustion engines, it is established to arrange catalytic converter systems with at least one catalytic converter in an exhaust gas duct of the combustion engine. Depending on the type of the catalytic converter the catalytic converter causes a conversion of one or several exhaust gas components, such as uncombusted hydrocarbons (HC), carbon monoxide (CO) and nitrous gases (NOx), into more ecologically relevant products. Furthermore catalytic converters are familiar, which have storage components, which are able to absorb certain pollutants. Thus NOx storage catalytic converters are in particular used at lean-loadable combustion engines, which absorb in lean operating phases with $\lambda>1$ NOx and which carry out a reduction of the stored NOx with $\lambda<1$ in interconnected rich regeneration phases.

More or less strong interruptions of conversion and/or storage activities as opposed to an original activity of the catalytic converter occur practically at all catalytic converter systems during the operation. The activities with regard to a conversion or storage of different pollutants can thereby decline by different amounts. Diverse damaging patterns are in particular known at NOx storage catalytic converters, which for example cause a significant deactivation of the NOx volume at a still good HC-conversion. Likewise however an exactly contrary damaging behavior is also known.

Stricter laws in the area of diagnosing emission relevant components require the controlling of all exhaust gas after-treatment components in the range of the on-board-diagnosis (OBD) as well as the used sensor system on OBG-threshold values, which are mostly stated as a multiple of the emission threshold value. Especially the controlling of the catalytic converters is a big challenge.

According to the state of the art a number of different diagnosing procedures of exhaust gas after-treatment systems are already familiar.

DE 41 12 478 C2 for example describes a procedure for assessing the ageing status of a catalytic converter, at which the lambda values are measured in front of and after the catalytic converter. It is examined whether the lambda value behind the catalytic converter shows a corresponding transfer during a regulating oscillation in front of the catalytic converter from rich to lean or reverse, and then, if that is the case, the gas mass flow that runs through the catalytic converter is determined, the temporal integral of the product of the gas mass flow and lambda value in front of the catalytic converter is calculated, the temporal integral of the product of the gas mass flow and lambda value behind the catalytic converter is calculated and either the difference between the two integrals or the quotient of both integrals or the quotient of the difference and one of the two integrals is used as a measure for the ageing status of the catalytic converter. The disadvantage of the described procedure is that the lambda value in front of the exhaust gas purification system has to be measured with a complex wideband lambda probe, in order to determine the inserted or extracted oxygen amount via the integration of the product of the actual lambda value and the gas mass flow.

DE 198 03 828 A1 describes a procedure as well as a device for controlling an exhaust gas catalytic converter at combustion engines, at which the oxygen content of the exhaust gas after the catalytic converter is determined and at which the average oxygen content of the exhaust gas in front of the catalytic converter is shifted in a direction which leads away from the previously determined oxygen content after the catalytic converter and at which the change of the oxygen filling level of the catalytic converter that results from the change of the average oxygen content is determined and compared to a predetermined threshold value and at which an error message is remains undone if the predetermined threshold value is exceeded before the oxygen content of the exhaust gas after the catalytic converter changes.

DE 10 2006 041479 A1 describes a further procedure for determining the oxygen storage capacity of an exhaust gas purification system for a combustion engine, at which a difference amount between an oxygen amount that is entered into the exhaust gas purification system and an oxygen amount that is emitted from the exhaust gas purification system. It is enabled to begin a measuring cycle even at a catalytic converter that is not completely emptied of oxygen or filled with oxygen and to state whether the catalytic converter provides a sufficient conversion capability. Furthermore an average of oxygen can be considered at a not completely filled exhaust gas purification system, the so-called slip.

Current requirements regarding an on-board diagnosis, as they are know from the USA, require for example a controlling of oxygen catalytic converters, for example diesel oxidization catalytic converters (DOC), of their capability to provide a suitable gas composition, a so-called "feed gas", for subsequently mentioned exhaust gas after-treatment systems. The focus is currently on the provision of a defined NO/NO2 relation, so that the NOx reduction in the subsequent SCR catalytic converter can run optimally. SCR (selective catalytic reduction) means the technique of the selective catalytic reduction of nitrous gases in exhaust gases of firing systems, waste incineration plants, gas turbines, industrial plants and engines. The chemical reaction at the SCR-catalytic converter is selective, which means that preferable nitrous gases (NO, NO2) are reduced while undesired side reactions (as for example the oxidization of sulfur dioxide to sulfur trioxide) is mostly suppressed. There are two types of catalytic converters. One type basically consists of titan dioxide, vanadium pentoxide and tungsten oxide. The other type uses zeolites.

One requirement relates to a controlling of the coating of a diesel particle filter (DPF) of its capability to oxide uncombusted carbon monoxides (HC).

But with the currently available procedures it is not possible to fulfill all requirements for a controlling. Thus it is for example not possible to evaluate the NO oxidization capability of a diesel oxidization catalytic converter (DOC) with the aid of the HC conversion capability, because the NO oxidization capability declines faster, which means "ages", and therefore there is no suitable correlation of the two characteristics. If one tries on the other hand to control the DPF-coating with the exothermic procedure known from the diesel oxidization catalytic converter (DOC), one fails because of the too low HC amount, which still achieve a diesel particle filter (DPF) that follows the diesel oxidization catalytic converter under normal circumstances.

SUMMARY

It is therefore the task of the invention to provide a procedure, which allows a reliable and improved controlling of a catalytic converter, in particular an oxidization catalytic converter upon its NO oxidization capability.

It is furthermore the task of the invention to provide a corresponding device.

The task that relates to the device is thereby solved, in that with the aid of a diagnosing unit, which is connected on the input side next to the exhaust gas sensors with at least one temperature sensor for determining the temperature or the temperature increase and/or a HC-sensor for determining partially uncombusted hydrocarbons behind the oxidization catalytic converter and with the aid of their signals a diagnosing forecast about the NO oxidization capability of the catalytic converters can be derived, whereby the partially uncombusted hydrocarbons can be inserted at least partially aimed in front of the catalytic converters in the exhaust gas duct, if necessary for example with the aid of special metering devices, which can be controlled by the diagnosing unit.

The procedure according to the invention provides thereby that with the aid of an adsorption capability of at least partially uncombusted hydrocarbons of one of the catalytic converters a diagnosing forecast about the NO oxidization capability of the catalytic converters can be derived, whereby the partially uncombusted hydrocarbons are at least partially aimed introduced in front of the catalytic converter into the exhaust gas duct.

According to the invention the procedure uses thereby the adsorption capability of hydrocarbons (HC) of the catalytic converters as an indicator for their damaging, for example due to a thermal overstressing. The state of this indicator gives thereby information about the capability of the catalytic converter to be able to oxide NO. With the procedure and the device for implementing the procedure, the NO oxidization capability of the involved catalytic converters can be evaluated within the range of extended on-board diagnosis requirements regarding the capability to provide so-called "feed gas" for subsequent exhaust gas after-treatment systems.

A preferred variant of the procedure provides that the adsorption capability at partially uncombusted hydrocarbons is determined with the aid of the extent of the temperature increase or an achieved temperature value during a burn-off of the introduced hydrocarbon amount. This exothermic heat is released if the previously introduced hydrocarbons are desorbing from a certain temperature on and are then burnt at the noble metal coating of the oxidization catalytic convert with the oxygen in the exhaust gas. A further possibility for detecting partially uncombusted hydrocarbons provides the usage of at least one HC-sensor in flowing direction of the exhaust gas after the catalytic converter. Thereby a burning HC-amount can be directly detected.

It can thereby be provided that a defined hydrocarbon amount is introduced in front of the catalytic converter that is construed as an oxidization catalytic converter for the diagnosis, so long until a hydrocarbon breakthrough is detected by the HC-sensor, whereby this is carried out below a temperature, at which the oxidization catalytic converter has a noteworthy efficiency for a hydrocarbon conversion. This temperature is also called light-off temperature or start-up temperature. The conversion rate increases significantly over 50% at this temperature. The start-up temperature is at about 250° C. at Otto engines depending on the type of pollutant. The start-up temperature for an operation of diesel engines is below 200° C. The start-up temperature is however no constant value, but increases with the ageing of the catalytic converter. The start-up temperature is furthermore different for the individual reactions and therefore for the individual types of pollutants.

One alternative provides that the extent of the hydrocarbon desorption at an enthalpy input in front of the oxidization catalytic converter are measured with the HC-sensor and correlated with an activity of the oxidization catalytic converter.

Because the current, age-related HC storage capability and also the age-related noble metal oxidization activity have been chemically adjusted to each other, which means they correlate, there is the possibility to control the catalytic coating of the oxidization catalytic converter on its capability to oxidize NO robustly and reliably and therefore to fulfill the statutory provisions.

It is provided in one embodiment of the procedure that the amount of hydrocarbons that has been introduced for the diagnosis takes place actively with the aid of an after-injection. Due to the after-injection a sufficiently big amount of uncombusted hydrocarbons can get into the exhaust gas duct.

Alternatively or in combination it can be provided that the amount of hydrocarbons that has been introduced for the diagnosis into the exhaust gas duct in front of one of the catalytic converters takes place with the aid of a separate HC metering device. The HC supply can thereby take place directly in front of the catalytic converter components that have to be diagnosed.

A further possibility for a diagnosing period of time is the cold start phase of the combustion engine, whereby the amount of hydrocarbons that is introduced for the diagnosis takes place at the cold start of the combustion engine. In particular during this phase the exhaust gas provides an increased percentage of partially uncombusted hydrocarbons.

A preferred variant of the procedure provides that in the case of falling below a threshold value of the hydrocarbon storage capability or a characteristic that correlates with that, as for example an exothermic heat release, a critical activity for the NO oxidization capability is registered and a heat message, for example with the aid of controlling a warning light in the dashboard, and/or an input is carried out in a error memory of an engine control. Thereby an on-board diagnosis can be realized that corresponds with the required statutory provisions.

A preferred embodiment of the procedure, as it has been described before in its different configurations, provides the use at a diesel particle filter in order to be able to diagnose the conversion capability with the aid of the HC storage capability of a coating of the diesel particle filter.

It can thereby be provided that the diesel particle filter is combined with an upstream oxidization catalytic converter (diesel oxidization catalytic converter DOC). It is here provided that a sufficiently big HC amount is introduced into the ensemble from an oxidization catalytic converter and a diesel particle filter that is coated catalytically, which is enough in order to also store hydrocarbons in the diesel particle filter coating that follows the oxidization catalytic converter. With the aid of the determination of the heat tone above the oxidization catalytic converter and if necessary additionally above the diesel particle filter coating or the HC desorption rate with the aid of the HC-sensor after the oxidization catalytic converter and after the diesel particle filter coating even the diesel particle filter can be controlled as to its oxidization capability. The ageing of the HC storage material is thereby adjusted to the expected ageing of the diesel particle filter coating.

A further advantage of the use of this procedure is that the stored HC amount, which has been collected on the catalytic converter at temperatures below the light-off temperature of the diesel oxidization catalytic converter, is still used for the evaluation of the oxidization capability of the downstream diesel particle filter coating at a later point of time, which means when the hydrocarbons desorb at least partially from the diesel oxidization catalytic converter. At a corresponding interpretation of the HC storage capability of the diesel oxidization catalytic converter it can be achieved that at a desired HC-desorption a part of the released hydrocarbons does not burn at the diesel oxidization catalytic converter but transfers to the downstream diesel particle filter coating of the diesel particle filter and burns there or is buffered again. The combustion can thereby be evaluated with the aid of an evaluation of the exothermic heat, as described before. New buffer storage can be realized by an evaluation of the HC storage capacity of the diesel particle filter coating or a HC slip. The evaluation of the HC storage capability can therefore also be used at a diesel particle filter coating as an indicator for further functions of the coating such as the NO oxidization capability.

In a special device variant it can be provided that at least one of the catalytic converters provides at least one storage component for partially uncombusted hydrocarbons, whereby it consists of zeolite materials, and the storage capacity for hydrocarbons is reduced at temperatures, at which a noble metal sintering of the oxidization catalytic converter begins. This can for example take place by a hydrothermal reduction of the zeolite materials.

The adjustment of the storage capacity can thereby be specifically adjusted to the sintering temperature of the noble metal by a variation of the silicon/aluminum relation and/or the zeolite type.

In a further embodiment it is provided that at least one of the catalytic converters provides additionally oxygen storing components (oxygen storage capacity or oxygen storage capability, OSC), as for example cer-oxides, cer/zircon mixed oxides and/or praseodymium and/or neodymium oxide. They can also correlate with the noble metal sintering with regard to their ageing behavior, which means the oxygen storage capacity that declines with time due to ageing.

In combination with the storage capacity for hydrocarbons therefore two characteristics that are potentially hydrocarbon consuming overlap or add up, namely the direct HC storage and a consumption by reaction of the hydrocarbons with the OSC material, which can increase the sensitivity of the procedure further. At a new oxidization coating, which contains HC storage materials and OSC-materials, compared to an aged coating a bigger exothermic heat is observed and measured after introducing a defined HC amount, which, as previously described, is introduced, and/or a lower HC amount up to the HC breakthrough after the catalytic converter. That difference can then be correlated with the NO oxidization capability of the coating.

BRIEF DESCRIPTION OF THE DRAWINGS

The invention is further explained in the following with the aid of an embodiment that is illustrated in the figures. It is shown in.

DETAILED DESCRIPTION

Figure 1:
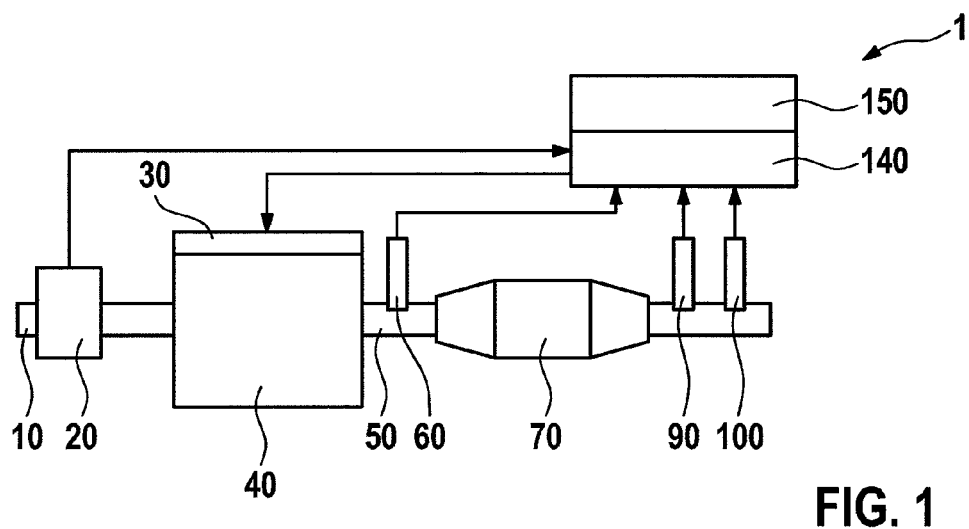
FIG. 1 a technical environment in a schematic illustration, in which the procedure according to the invention can be used, FIG. 2 an alternative technical environment, in which the procedure according to the invention can be used.

FIG. 1 shows exemplarily a technical environment, in which the procedure according to the invention can be used. The illustration is thereby limited to the components that are necessary for the explanation of the invention.

The figure illustrates a combustion engine 1, consisting of an engine block 40 and a supply air duct 10, which supplies the engine block 40 with combustion air, whereby the air volume in the supply air duct 10 can be determined with a supply air measuring device 20. The exhaust gas of the combustion engine 1 is thereby directed over an exhaust gas purification system, which provides an exhaust gas duct 50 as main component, in which a first exhaust gas sensor 60 is arranged in streaming direction of the exhaust gas, a lambda probe for determining the oxygen content in front of a catalytic converter 70 and if necessary a second exhaust gas sensor 90, a further lambda probe behind the catalytic converter 70.

The exhaust gas sensors 60, 90 are connected with an engine control 140 (engine electronic), which calculates the mixture from the data of the exhaust gas sensors 60, 90 and the data of the supply air measuring device 20 and which controls a fuel metering device 30 for metering fuel. Coupled with the engine control 140 or integrated into it a diagnosing unit 150 is provided, with which the signals of the exhaust gas sensors 60, 90 can be evaluated. The diagnosing unit 150 can furthermore be connected with a display/storage unit, which is not further illustrated.

With the exhaust gas sensor 60 that is arranged in the exhaust gas duct 50 behind the engine block 40 a lambda value can be adjusted with the aid of the engine control 140, which is suitable for the exhaust gas purification system for achieving an optimal regeneration effect. The second exhaust gas sensor 90 that is arranged in the exhaust gas duct 50 behind the catalytic converter 70 can also be evaluated in the engine control 140 and serves for determining the oxygen storage capacity of the exhaust gas purification system in a procedure according to the state of the art.

The catalytic converter 70 can for example be construed as three-way catalytic converter, which catalytically supports the oxidization of uncombusted hydrocarbons (HC) and carbon monoxide (CO) as well as the reduction of nitrous gases NOx. The catalytic converter can furthermore provide at least one storage component, for example for nitrous gases, so that it is stored in lean operation phases ($\lambda>1$) NOx and released and converted in rich operating phases ($\lambda<1$). In order to control the catalytic converter temperature a temperature sensor 100 is provided in the exhaust gas duct 50 in the shown example in streaming direction of the exhaust gas behind the catalytic converter 70, which is also connected to the engine control 140 and which can evaluate the temperature signals there.

According to the invention it is provided for the diagnosis of the NO oxidization capability of the catalytic converter 70 that a diagnosing forecast for the NO oxidization capability of the catalytic converter 70 is diverted with the aid of an adsorption capability of at least two partially uncombusted hydrocarbons (HC) of the catalytic converter 70, whereby the partially uncombusted hydrocarbons are at least partially aimed introduced into to the exhaust gas duct 50 in front of the catalytic converter 70. This takes place in the illustrated example by an after-injection of fuel, whereby the fuel metering device 30 received corresponding control signals from the diagnosing unit 150 over the engine control 140. The adsorption capability of at least partially uncombusted hydrocarbons can be determined with the aid of the extent of the temperature increase or an achieved temperature value, which can be determined with the temperature sensor 100, during a burn-off of the introduced hydrocarbon amount.

Figure 2:
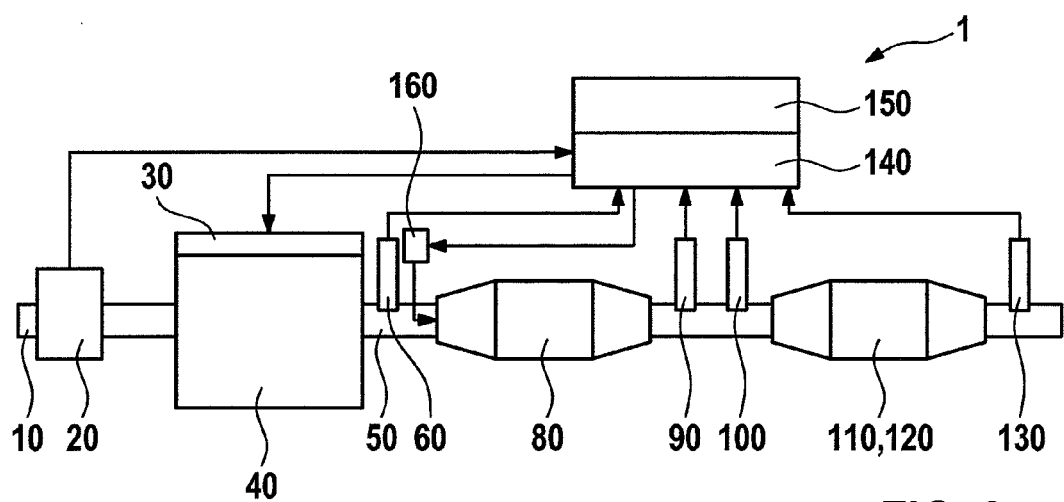

FIG. 2 shows just like FIG. 1 a further embodiment for a technical environment, whereby the same reference signs are used for the same components.

Contrary to the arrangement shown in FIG. 1 the combustion engine 1 provides two catalytic converters in its exhaust gas duct 50, a pre-catalytic converter 80, which is arranged near the engine and which is construed as three-way catalytic converter, and a main catalytic converter 110. Alternatively a diesel particle filter 120 (DPF) can also be provided instead of the main catalytic converter 110, which provides a catalytic coating. In that case the pre-catalytic converter 80 is construed as diesel oxidization catalytic converter (DOC).

According to the invention it is provided for the diagnosis of the NO oxidization capability of the catalytic converter 70 that a diagnosing forecast for the NO oxidization capability of the catalytic converter 70 is derived with the aid of an adsorption capability of at least two partially uncombusted hydrocarbons (HC) of the catalytic converter 70, whereby the partially uncombusted hydrocarbons are at least partially aimed introduced into to the exhaust gas duct 50 in front of the catalytic converter 70. This takes place in the illustrated example by an after-injection of fuel, whereby the fuel metering device 30 received corresponding control signals from the diagnosing unit 150 over the engine control 140. The adsorption capability of at least partially uncombusted hydrocarbons can be determined with the aid of the extent of the temperature increase or an achieved temperature value, which can be determined with the temperature sensor 100, during a burn-off of the introduced hydrocarbon amount.

The introduction of the HC amount takes place in that example with the aid of a separate HC-metering device 160, which injects fuel into the exhaust gas duct 50 in front of the pre-catalytic converter 80 which is construed as diesel oxidization catalytic converter (DOC). This HC metering device 160 is also controlled by the diagnosing unit 150 over the engine control 140.

With the procedure and the device for implementing the procedure the NO oxidization capability of the involved catalytic converters can be evaluated in the range of extended on-board diagnosing requirements with regard to the capability to provide so-called "feed-gas" for subsequent exhaust gas after-treatment systems.

The invention claimed is:

1. A method for controlling an exhaust gas purification system of a combustion engine, the method comprising:
    storing at least one exhaust gas component of an exhaust gas with at least one catalytic converter comprising an oxidization catalytic converter, the at least one catalytic converter connected to the combustion engine via an exhaust gas duct;
    introducing a defined amount of uncombusted hydrocarbons into the exhaust gas duct upstream of the at least one catalytic converter;
    determining, via a diagnostic unit, an absorption capability of uncombusted hydrocarbons within one of the at least one catalytic converter;
    utilizing the absorption capability to forecast, via the diagnostic unit, NO oxidization capability of the at least one catalytic converter;
    wherein determining the absorption capability comprises one or both of the steps:
    a) determining a temperature increase or an achieved temperature value during a burn-off of the introduced uncombusted hydrocarbons;
    b) detecting partially uncombusted hydrocarbons downstream of the at least one catalytic converter.

2. The method of claim 1, the method further comprising detecting a hydrocarbon breakthrough, via a hydrocarbon sensor, wherein introducing uncombusted hydrocarbons comprises introducing a defined amount of uncombusted hydrocarbons upstream of the at least one catalytic converter, wherein when the hydrocarbon breakthrough detection occurs below a predetermined temperature the at least one catalytic converter has a given efficiency for hydrocarbon conversion.

3. The method of claim 1, further comprising:
    measuring, via a hydrocarbon sensor, an extent of hydrocarbon desorption at an enthalpy input, the enthalpy input being upstream of the at least one catalytic converter; and
    correlating the extent of hydrocarbon desorption with an activity of the at least one catalytic converter.

4. The method of claim 1, wherein the introducing the uncombusted hydrocarbons occurs via an after-injection.

5. The method of claim 1, wherein introducing the uncombusted hydrocarbons into the exhaust gas duct occurs with the aid of a hydrocarbon metering device.

6. The method of claim 1, wherein introducing the uncombusted hydrocarbons into the exhaust gas duct occurs at a cold start of the combustion engine.

7. The method of claim 1, further comprising:
    registering a critical activity for a NO oxidization capability when a hydrocarbon storage capacity or a characteristic that correlates with the hydrocarbon storage capacity falls below a threshold value; and
    sending a warning message to an engine control, when the hydrocarbon storage capacity or the characteristic falls below the threshold value.

8. The method of claim 1 wherein the storage capability of the at least one catalytic converter is adjustable by adjusting a variation of a zeolite within the at least one catalytic converter.

9. The method of claim 1, wherein the combustion engine is a diesel engine and a diesel particle filter is used in determining the absorption capability.

10. The method of claim 9, wherein using the diesel particle filter to determine the absorption capability comprises using an upstream oxidization catalytic converter in conjunction with the diesel particle filter.

11. A system for controlling an exhaust gas purification system, the system comprising:
    a combustion engine comprising an exhaust;
    an exhaust duct in fluid communication with the exhaust;
    at least one catalytic converter in fluid communication with the exhaust duct, wherein one of the at least one catalytic converters is an oxidization catalytic converter; and
    a diagnostic unit programmed to:
    receive, from a temperature sensor, a temperature or temperature increase of uncombusted hydrocarbons injected in a defined amount into the exhaust duct upstream of the at least one catalytic converter;

receive, from a hydrocarbon sensor, an indication of an amount of uncombusted hydrocarbons downstream of the at least one catalytic converter; and derive a forecast of an NO oxidization capability of the at least one catalytic converter using the temperature or temperature increase and the amount of uncombusted hydrocarbons downstream of the at least one catalytic converter.

12. The system of claim 11 wherein the at least one catalytic converter comprises a storage compartment comprising a zeolite material, a storage capability of the at least one catalytic converter being adjustable by adjusting a zeolite type of the zeolite material.

13. The system of claim 11, further comprising a hydrocarbon metering device in fluid communication with the exhaust duct and arranged to inject the uncombusted hydrocarbons into the exhaust duct upstream of the at least one catalytic converter, wherein the hydrocarbon metering device is controlled by the diagnostic unit.

14. The system of claim 13, wherein the storage capability for hydrocarbons is reduced at temperatures at which a noble metal sintering of the oxidization catalytic converter begins.

15. The system of claim 14, wherein the storage capability can be further adjusted by adjusting a variation of silicon/aluminum within the oxidization catalytic converter.

16. The system of claim 11 wherein the at least one catalytic converter comprises a storage compartment comprising a zeolite material, a storage capability of the at least one catalytic converter being adjustable by adjusting a zeolite type of the zeolite material.

17. The system of claim 11, wherein at least one of the at least one catalytic converter comprises an oxygen storing component.

\* \* \* \* \*